United States Patent [19]
Harstead et al.

[11] Patent Number: 5,912,749
[45] Date of Patent: *Jun. 15, 1999

[54] CALL ADMISSION CONTROL IN CELLULAR NETWORKS

[75] Inventors: Edward Eric Harstead, New York, N.Y.; Wayne Harvey Knox, Rumson, N.J.; Martin C. Nuss, Fair Haven, N.J.; Jason Blain Stark, Holmdel, N.J.

[73] Assignee: Lucent Technologies Inc., Murray Hill, N.J.

[*] Notice: This patent is subject to a terminal disclaimer.

[21] Appl. No.: 08/798,895

[22] Filed: Feb. 11, 1997

[51] Int. Cl.$^6$ .............................. H04J 14/02; H04J 14/08
[52] U.S. Cl. ........................ 359/123; 359/125; 359/132; 359/140
[58] Field of Search ............................. 359/123, 120, 359/178, 125, 140, 132, 133

[56] References Cited

U.S. PATENT DOCUMENTS

| | | | |
|---|---|---|---|
| 5,337,175 | 8/1994 | Ohnsorge et al. | 359/125 |
| 5,438,444 | 8/1995 | Tayonaka et al. | 359/123 |
| 5,559,624 | 9/1996 | Darcie et al. | 359/125 |
| 5,631,758 | 5/1997 | Knox et al. | 359/127 |
| 5,793,507 | 8/1998 | Giles et al. | 359/125 |

Primary Examiner—Leslie Pascal
Attorney, Agent, or Firm—Stephen M. Gurey

[57] ABSTRACT

A unique time slot is assigned to each of a plurality of wavelengths emitted by a single, centralized wavelength division multiplexed optical source to provide a "bit interleaved" WDM signal. In accordance with an illustrative embodiment of the present invention, the thus-developed bit-interleaved WDM signal is replicated in cascaded stages of amplification and power splitting before data is encoded for respective frequency dependent receivers as, for example, a plurality of passive optical networks. Because the output of the optical source need not be encoded with data for the respective receivers until after many stages of splitting and amplification, a small number of time division multiplexing (TDM) modulators synchronized to the source may be used to deliver data to potentially tens of thousands of subscribers.

17 Claims, 4 Drawing Sheets 5,912,749

1

CALL ADMISSION CONTROL IN CELLULAR NETWORKS

REFERENCE TO RELATED APPLICATIONS

The present invention is related to U.S. patent application Ser. No. 08/548,537 filed on Oct. 26, 1995, now U.S. Pat. No. 5,631,758, issued May 20, 1997, entitled Chirped-Pulse Multiple Wavelength Telecommunications System; to U.S. patent application Ser. No. 08/706,029 filed on Aug. 30, 1996, entitled Optical Communication System Employing Spectrally Sliced Optical Source; and to U.S. patent application Ser. No. 08/656,023 filed on May 31, 1996, now U.S. Pat. No. 5,793,507 issued Aug. 11, 1998, entitled Discretely Chirped Multiple Wavelength Optical Source For Use In A Passive Optical Network Telecommunications System.

FIELD OF THE INVENTION

The present invention relates generally to optical communication systems and, more particularly, to optical fiber communication systems in which multiple information channels are carried on a single mode optical fiber.

BACKGROUND OF THE INVENTION

A passive optical network typically consists of a transmitter, feeder fiber, a remote branching device, and an optical network unit (ONU) for each subscriber or group of subscribers. In a conventional TDM power splitting passive optical network, the transmitter emits an aggregated signal on a single wavelength, while the branching device splits the aggregated signal into a plurality of identical signals, each such signal being distributed to a corresponding ONU configured to receive at the aggregate bit-rate.

In a wavelength division multiplexed (WDM) passive optical network, each transmitted wavelength carries data for a single ONU and is modulated at the baseband bit rate. The branching device, which may comprise, for example, a wavelength grating router, establishes a virtual point-to-point link between the transmitter and the ONU. A multifrequency optical source such as a multifrequency laser or a WDM laser array is customarily used to generate the comb of wavelengths required for the WDM network.

Since data for each wavelength channel is encoded directly at the multifrequency optical source, for example, by turning on and off individual elements of a multifrequency laser array, one WDM multifrequency laser is required for each N subscribers or optical network units, where N is the number of wavelengths emitted by the laser. Due to the high cost of multifrequency optical sources, WDM for fiber distribution networks as they have heretofore been envisioned is not deemed cost-competitive with conventional power splitting passive optical networks or even simple point-to-point schemes (one fiber per customer). Accordingly, there is a continuing need for an efficient and cost-effective WDM system that is capable of transmitting a large number of spectral channels.

SUMMARY OF THE INVENTION

The aforementioned deficiencies are addressed, and an advance is made in the art by an optical communications network architecture in which optical power splitting techniques and, optionally, optical amplifiers such as erbium doped fiber amplifiers (EDFAs), for example, are deployed in a cascaded distribution fabric that permits a single multiple frequency optical source to serve as the primary optical source for a substantially higher number of frequency dependent receivers, such as passive optical networks including one or more optical network units, than has heretofore been possible.

A unique time slot is assigned to each of a plurality of wavelengths emitted by a single, centralized wavelength division multiplexed (WDM) optical source to provide a "bit interleaved" WDM signal. In accordance with the present invention, the thus-developed bit-interleaved WDM signal is replicated in cascaded stages of amplification and power splitting before data is encoded for respective frequency dependent receivers as, for example, a plurality of WDM passive optical networks. Because the output of the optical source need not be encoded with data for the respective receivers until after many stages of splitting and amplification, a small number of time multiplexing (TDM) modulators synchronized to the source may be used to deliver data to potentially tens of thousands of subscribers.

The various features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWINGS

A more complete understanding of the invention may be obtained by reading the following description of specific illustrative embodiments of the invention in conjunction with the appended drawings in which.

DETAILED DESCRIPTION OF THE INVENTION

Figure 1:
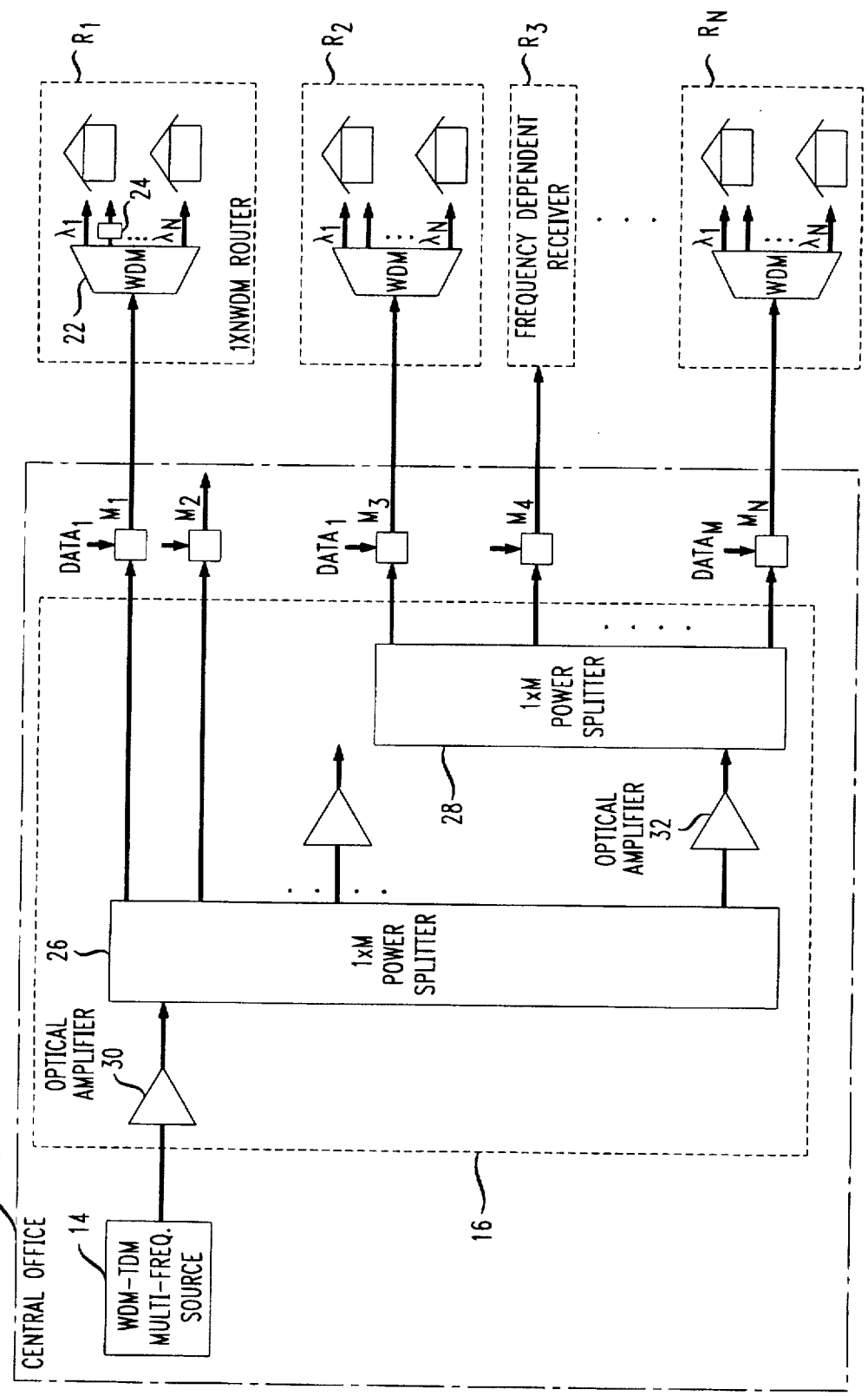
FIG. 1 is a schematic diagram of a cascaded multiple wavelength optical communications system utilizing a single multiple wavelength optical source to serve a number of passive optical networks in accordance with an illustrative embodiment of the present invention.

With initial reference to FIG. 1, there is shown an optical communications system 10 constructed in accordance with an illustrative embodiment of the present invention. By way of illustrative example, optical communications system 10 may be implemented in a local access communication network designed to serve many thousands of subscribers. In any event, as seen in FIG. 1, it will be seen that communications system 10 includes a transmitter 12 comprising a bit-interleaved multifrequency light source 14 for sequentially emitting N wavelength channels, a cascaded distribution fabric 16, a plurality of data-encoding modulators $M_1$–$M_n$, and a plurality of frequency dependent receivers $R_1$–$R_n$. Illustratively, some or all of the frequency dependent receivers may be configured as passive optical networks (PONs) consisting of, as shown in FIG. 1, a WDM splitter 22 having multiple output ports each for supplying a respectively discrete wavelength (or a narrow wavelength band or channel centered around that wavelength) to an associated optical network unit 24. Alternate PON configurations are, of course, possible. For example, in lieu of a wavelength selective router, a simple power splitter (not shown)— having its output ports optically coupled to respective frequency selective filters (not shown)—may be used to distribute the discrete wavelengths to the appropriate optical network units.

As will soon become apparent, a principal advantage of the present invention resides in the ease to which communication system 10 can be scaled to accommodate the addition of many more subscribers, as needed, merely by introducing one or more additional power splitting and amplification stages, and a number of modulators, corresponding to the number of WDM passive optical networks to be introduced, to distribution fabric 14. Essentially, for k stages of 1:M power-splitters, and N wavelength channels, the number of subscribers served is $M^k \times N$.

In accordance with the present invention, optical source 12 is configured as a bit-interleaved multifrequency source, in which there is only a single wavelength or wavelength channel centered around that wavelength, present at any given time. One optical source which is suitable for the purposes of the present invention is disclosed in U.S. patent application Ser. No. 08/548,537 by Knox et al., now U.S. Pat. No. 5,631,758, issued May 20, 1997, entitled CHIRPED PULSE MULTIPLE WAVELENGTH COMMUNICATIONS SYSTEM and assigned to the assignee herein, Lucent Technologies Inc., which application is expressly incorporated herein by reference.

Knox et al. disclose a technique in which the output of a broadband short-pulse source is stretched to a large fraction of the time between pulses by linear dispersion in a fiber. The dispersion imposes a linear frequency chirp onto the stretched pulses, so that each WDM channel occupies a different time slot. A femtosecond laser was employed by Knox et al. as the broadband short-pulse source. For example, a transform-limited Gaussian laser pulse of duration t has a time bandwidth product $(\Delta v)(t)=0.44$, so that a 70 fs laser pulse has an optical bandwidth (FWHM)($\Delta v$) of 6.4 THz, enough for 32 WDM channels spaced at 200 GHz. For the purposes of the present invention, however, any multifrequency optical source that can supply an optical signal having a plurality of wavelength division multiplexed (WDM) channels in which substantially all light supplied over a given time interval is within a single WDM channel, may be used.

Illustratively, in lieu of a femtosecond laser, a short pulse ASE source may be employed. By way of further example, a gain switched diode laser—amplified and spectrally broadened by self-phase modulation in a fiber—may be used. See "Electro-Optic Testing of Ultrafast Electronic and Optoelectronic Devices" by T. Nagatsuma, Technical Digest, p. 46, Optical Society of America, Washington, 1995. Yet another multifrequency optical source which may be utilized to implement the present invention is disclosed in U.S. patent application Ser. No. 08/656,023 by Giles et al., now U.S. Pat. No. 5,793,507, issued Aug. 11, 1998, entitled DISCRETELY CHIRPED MULTIPLE WAVELENGTH OPTICAL SOURCE FOR USE IN A PASSIVE OPTICAL NETWORK TELECOMMUNICATIONS SYSTEM. In the latter application, there is proposed a discretely chirped WDM source that, illustratively, comprises a WDM laser array in which successive wavelength channels are pulsed on and off serially, thus generating a step-function approximation to a continuously chirped WDM source.

Yet another example of a suitable multifrequency bit-interleaving optical source is disclosed in U.S. patent application Ser. No. 08/706,029, by U. Koren et al, entitled "Optical Communication System Employing Spectrally Sliced Optical Source". Essentially, Koren et al. propose an arrangement in which the output of a broad spectrum optical source such as a light emitting diode is supplied to a wavelength splitter having at least one input port and a plurality of output ports each corresponding to an individual wavelength channel. Each of the output ports have optically coupled thereto a respective length of optical fiber that is configured to provide a different time delay for each wavelength channel, thereby ensuring that each individual wavelength occupies a discrete time slot.

Figure 2:
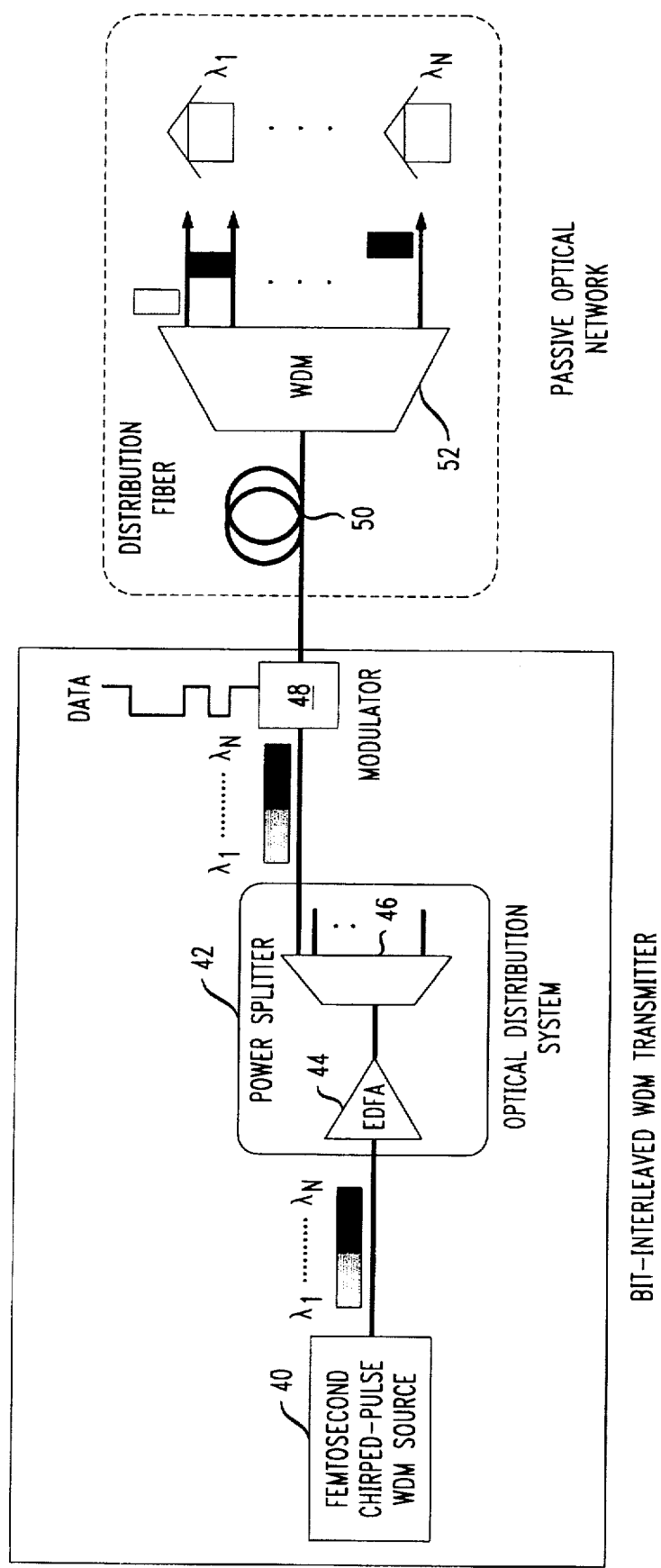
FIG. 2 is a schematic diagram of an investigative cascaded multiple wavelength optical communication system constructed in accordance with the present invention and used to evaluate the performance of a cascading distribution fabric, the bit interleaved multiple frequency optical source thereof being configured as a fiber-chirped, femtosecond-laser.

In view of the preceding discussion, it should be readily appreciated by those skilled in the art that although reference may be made hereafter to a femtosecond laser-chirped pulse multiple frequency source, as for example, in the discussion of the investigative apparatus depicted in FIG. 2, such reference is by way of illustration only and it is contemplated by the inventors herein that any bit interleaved, multiple frequency optical sources such as, for example, those enumerated above, may be employed. In any event, and with continued reference to FIG. 1, it will be seen that light emitted by source 12 propagates through cascaded distribution fabric 16. In the illustrative embodiment depicted in FIG. 1, only two stages of distribution fabric 16 are shown for clarity of illustration. Each stage comprises a 1:M power splitter 26, 28 and, where appropriate to maintain the requisite power level, a pre-amplifier 30, 32. The light passes through distribution fabric 16 and, thereafter, through a modulator as modulator $M_1$, where a TDM signal encodes data onto each WDM channel sequentially.

The fully-encoded WDM signal is then transmitted to a frequency dependent receiver as $R_1$, a passive optical network in the illustrative embodiment depicted in FIG. 1, for distribution to subscribers in their homes. For a power splitter with 32 output ports, a total of 32,768 PONs can be serviced using three cascaded stages of splitting, and a single WDM light source. For a PON having 16 WDM channels, this system serves 524,288 subscribers with a single source. In general, for k cascaded stages having M-fold split, and N WDM channels, a single light source serves $N \cdot M^k$ subscribers. The light source is shared by all subscribers, while the costs of the modulator and final cascade stage are shared by each PON.

An investigative system employing a linearly chirped femtosecond laser 40 as the bit-interleaved multifrequency source is shown in FIG. 2 and was constructed in order to evaluate the performance of a cascading distribution fabric according to the present invention. The distribution fabric 42 consists of a single power splitting stage employing an optical amplifier 44 and a power splitter 46 having an input port and a plurality of output ports. Before preamplification, the laser spectrum has a 3 dB bandwidth in excess of 70 nm and is centered about 1550 nm, a typical communications wavelength.

Figure 3A:
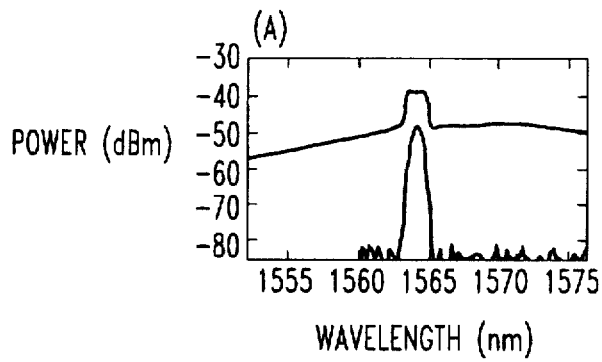
FIG. 3A is a graphical representation depicting the transmission spectra of data transmitted on a single wavelength channel launched into a distribution fiber after being encoded with a pseudo-random bit (PSBR) sequence with the single stage cascading distribution fabric being omitted from the investigative system of FIG. 2, the upper and lower traces respectively corresponding to the spectra observed at the input of the distribution fiber and at a single port of a demultiplexing waveguide grating router.
Figure 3B:
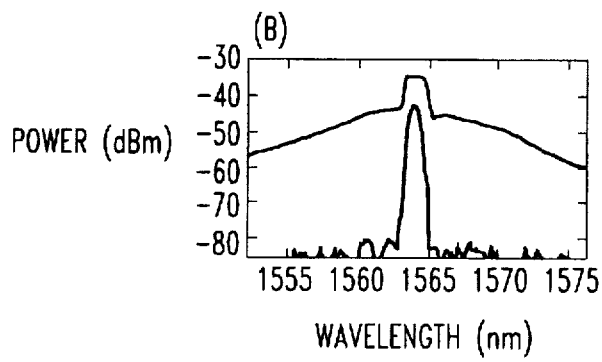
FIG. 3B is a graphical representation depicting the transmission spectra of data transmitted on a single wavelength channel launched into a distribution fiber after being encoded with a pseudo-random bit (PSBR) sequence with the single stage cascading distribution fabric incorporated as shown into the investigative system of FIG. 2, the upper and lower traces respectively corresponding to the spectra observed at the input of the distribution fiber and at a single port of a demultiplexing waveguide grating router.

The system was configured such that data for each separate channel may be multiplexed into the buffer of a pattern generator (not shown), and delivered in Non-Return-to-Zero (NRZ) format to a modulator 48. Each of the fifteen individual channels is programmable with a pseudo-random bitstream (PRBS), with variable offset. Additionally, each channel can be blanked, so that no data is transmitted on that channel. The performance of the system, in the absence of crosstalk, is first measured by transmitting a $2^{15}$ PRBS on a single channel. In the first measurement, a PRBS was transmitted on channel 8, at 1563.7 nm, while the remaining 15 channels were blanked. The transmission spectra, FIGS. 3A and 3B, show the light transmitted into the distribution fiber 50 (upper trace) and that received after port 8 (lower trace) of WDM router 52. The peaking of the output spectrum results from nonuniform gain in the preamplifier and distribution amplifier. This can be eliminated by using gain-flattened amplifiers, and by active equalization of the spectrum using the data modulator.

Figure 4:
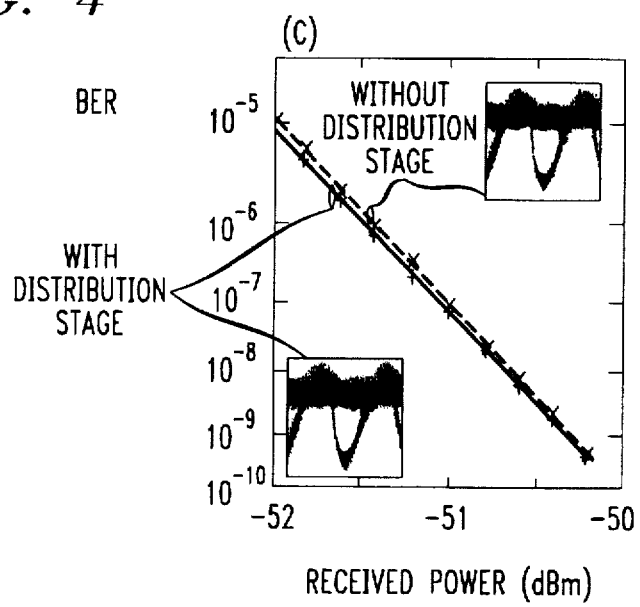
FIG. 4 graphically compares the bit error rate vs. received power observed in the PSBR encoded wavelength channel when the cascading distribution fabric was omitted from and included in, respectively, the investigative system of FIG. 2.

The BER vs. received power, FIG. 4, shows that the received power level for a bit error rate of $10^{-9}$ is −50.3 dBm without the distribution fabric, and −50.3 dBm with the distribution fabric. No significant power penalty is incurred by the introduction of the distribution stage. Transmission measurements made using channel 1, at the edge of the output spectrum show an overall power penalty of 1 dB, due to the peaking of the output spectrum, but no significant ASE penalty.

Figure 5A:
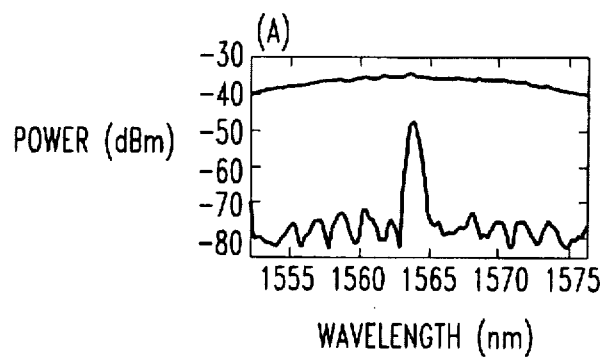
FIG. 5A is a graphical representation depicting the transmission spectra of data transmitted on fifteen wavelength channels launched into a distribution fiber after being encoded with a pseudo-random bit (PSBR) sequence by a single modulator, with the single stage cascading distribution fabric being omitted from the investigative system of FIG. 2 and the upper and lower traces respectively corresponding to the spectra observed at the input of the distribution fiber and at a single output port of a demultiplexing waveguide grating router.
Figure 5B:
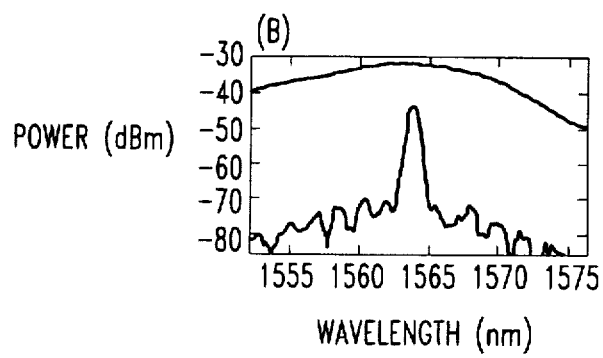
FIG. 5B is a graphical representation depicting the transmission spectra of data transmitted on fifteen wavelength channels launched into a distribution fiber after being encoded with a pseudo-random bit (PSBR) sequence by a single modulator, with the single stage cascading distribution fabric incorporated as shown into the investigative system of FIG. 2 and the upper and lower traces respectively corresponding to the spectra observed at the input of the distribution fiber and at a single port of a demultiplexing waveguide grating router.
Figure 6:
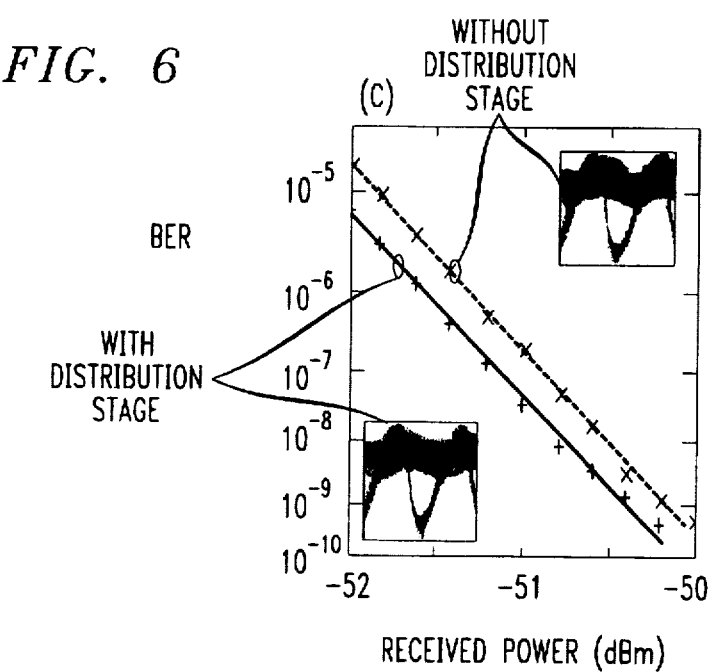
FIG. 6 is a graphical representation comparing the bit error rate vs. received power observed in one of fifteen PSBR encoded wavelength channels when the cascading distribution fabric was omitted from and included in the investigative system of FIG. 2.

With reference now to FIGS. 5A, 5B, and 6, the results of a second measurement, by which the effects of crosstalk may be evaluated, will now be discussed. For this measurement, a PRBS was transmitted on each of the fifteen wavelength channels, with the measurements again being taken at port 8 of the router. Each PRBS was offset by 736 bits, relative to the previous channel. The BER measurements, FIG. 6, indicates a sensitivity of −50.1 dBm and −50.3 dBm, without and with distribution stage, respectively. Comparing FIGS. 5A and 5B, the peaked spectrum of the distribution stage suppresses the crosstalk levels away from channel 8, resulting in a crosstalk penalty of −0.2 dB. Measurements of transmission on channel 1 again show a 1 dB penalty due to spectral peaking in the distribution stage. Again, it should be emphasized that the penalties associated with nonuniform gain in the amplifier stage can be eliminated by using gain-flattened amplifiers, only leaving an insignificant power penalty due to ASE, as discussed below.

Cascaded distribution in accordance with the present invention cannot be continued indefinitely. Each power splitter in the distribution fabric divides the input power among its individual output ports, and is preceded by a compensating amplifier, contributing noise to the transmission in the form of amplified spontaneous emission (ASE). The ASE power after a cascade of N stages is given by $$P_{ASE} = m\,hv\,\Delta v \sum_{k=1}^{N}(G_k - 1)L_k n_k^{sp} \prod_{m=k+1}^{N} G_m L_m \quad (1)$$

where m is the number of polarization modes, h Planck's constant, v the light frequency, $\Delta v$ the optical filter frequency bandwidth, $G_k$ the gain of stage k, $L_k$ the loss in stage k, and $n_k^{sp}$ the spontaneous emission factor of the amplifier in stage k. For N identical unity-gain stages the ASE power is $P_{ASE} = N\,mhv\,\Delta v\,n_{sp}$, amounting to 64 nW (−42 dBm) per stage in a 1 nm optical bandwidth, with m=2 and $n_{sp}$=2. The power penalty associated with cascaded distribution is $$P_p \approx \frac{10}{\ln(10)} \cdot \frac{P_{ASE}}{P_{signal}} dB, \quad (2)$$

when the receiver thermal noise power dominates optical shot noise. For a transmitted signal level of 100 μW (−10 dBm), and a three-stage cascade of 1:32 splitters, one half million subscribers can be served using a single source, with a power penalty of only 0.008 dB.

Although modifications and changes may be suggested by those skilled in the art, it is the intention of the inventors to embody within the patent warranted hereon all changes and modifications as reasonably and properly come within the scope of their contribution to the art.

What is claimed is:

1. An optical source distribution network, comprising:
   an optical transmitter including
      a multifrequency optical source for supplying an optical signal having a plurality of wavelength division multiplexed (WDM) channels, substantially all light supplied over a given time interval being within a single wavelength channel;
      a power splitter having an input port, for receiving the optical signal from said multifrequency source, and a plurality of output ports, and
      a plurality of data encoding modulators, each said data encoding modulator being coupled to one of said output ports and being operable to sequentially modulate at least some of the wavelength channels present on an output signal received from said power splitter; and
      a plurality of frequency dependent receivers, each said frequency dependent receiver being operable to receive and wavelength demultiplex a modulated optical signal received from one of said data encoding modulators over an optical medium.

2. The optical source distribution network according to claim 1, further including at least one optical amplifier coupled to a port of said power splitter.

3. The optical source distribution network according to claim 1, wherein said at least one optical amplifier is coupled to an input port of said power splitter.

4. The optical source distribution network according to claim 1, wherein said at least one optical amplifier is an erbium doped fiber amplifier.

5. The optical source distribution network according to claim 1, wherein said multifrequency source includes an array of substantially single frequency lasers, each emitting light constituting a respective wavelength channel and being operable to supply a pulse occupying a fraction of time such that only a single WDM laser in the array emits over a given time interval.

6. The optical source distribution network according to claim 1, wherein at least one of said frequency dependent receivers is a passive optical network including a wavelength router and a plurality of optical network units, each optical network unit receiving from said router a corresponding wavelength demultiplexed signal.

7. The optical source distribution network according to claim 1,
wherein said power splitter is a first power splitter, said optical source distribution network further including a second power splitter having an input port coupled to an output port of said first power splitter and a plurality of output ports, and
wherein at least one of said data encoding modulators is coupled to an output port of said second power splitter.

8. The optical source distribution network according to claim 7, further including at least one optical amplifier coupled to a port of one of said power splitters.

9. The optical source distribution network according to claim 7, further including at least one optical amplifier optically interconnecting ports of said first and second power splitters.

10. An optical transmitter for use in an optical source distribution network comprising:
a multifrequency optical source for supplying an optical signal having a plurality of wavelength division multiplexed (WDM) channels, substantially all light supplied over a given interval being within a single WDM channel;
a power splitter having an input port, for receiving the optical signal from said multifrequency source, and a plurality of output ports; and
a plurality of data encoding modulators, each said data encoding modulator being coupled to one of said output ports and being operable to sequentially modulate at least some of the WDM channels present on an output signal received from said power splitter.

11. The optical transmitter according to claim 10, wherein said multifrequency source includes an array of substantially single frequency lasers, each emitting light constituting a respective wavelength channel and being operable to supply a pulse occupying a fraction of time such that only a single WDM laser in the array emits over a given time interval.

12. The optical transmitter according to claim 10, further including at least one optical amplifier coupled to a port of said power splitter.

13. The optical transmitter according to claim 12, wherein said at least one optical amplifier is coupled to an input port of said power splitter.

14. The optical transmitter according to claim 10, wherein said power splitter is a first power splitter, said optical transmitter further including a second power splitter having an input port coupled to an output port of said first power splitter and a plurality of output ports.

15. The optical transmitter according to claim 14, wherein at least one of said data encoding modulators is coupled to an output port of said second power splitter.

16. A method of operating an optical multiple wavelength communication system comprising the steps of:
receiving, at a power splitter having an input port, an optical signal having a plurality of wavelength division multiplexed (WDM) channels, substantially all light received over a given interval being of a single WDM channel;
sequentially modulating at least some of the WDM channels present on an output signal received from said power splitter with a first modulator;
sequentially modulating at least some of the WDM channels present on an output signal received from said power splitter with a second modulator; and
launching the modulated WDM channels into an optical medium.

17. The method of claim 16, further including a step of receiving and wavelength demultiplexing respective modulated optical signals received from said data encoding modulators over the optical medium.

* * * * *

UNITED STATES PATENT AND TRADEMARK OFFICE
CERTIFICATE OF CORRECTION

PATENT NO. : 5,912,749
DATED : June 15, 1999
INVENTOR(S) : Edward Eric Harstead, Wayne Harvey Knox, Martin C. Nuss, Jason Blain Stark It is certified that error appears in the above-indentified patent and that said Letters Patent is hereby corrected as shown below:

The title of the patent should read, "Passive Optical Telecommunication System Employing Multiple Wavelength Source And Plural Power Splitting Stages"

Signed and Sealed this

Second Day of November, 1999

Attest:

Attesting Officer

Q. TODD DICKINSON

Acting Commissioner of Patents and Trademarks